April 5, 1938.   E. L. CHOTT   2,113,460
DISPENSER
Filed May 13, 1936
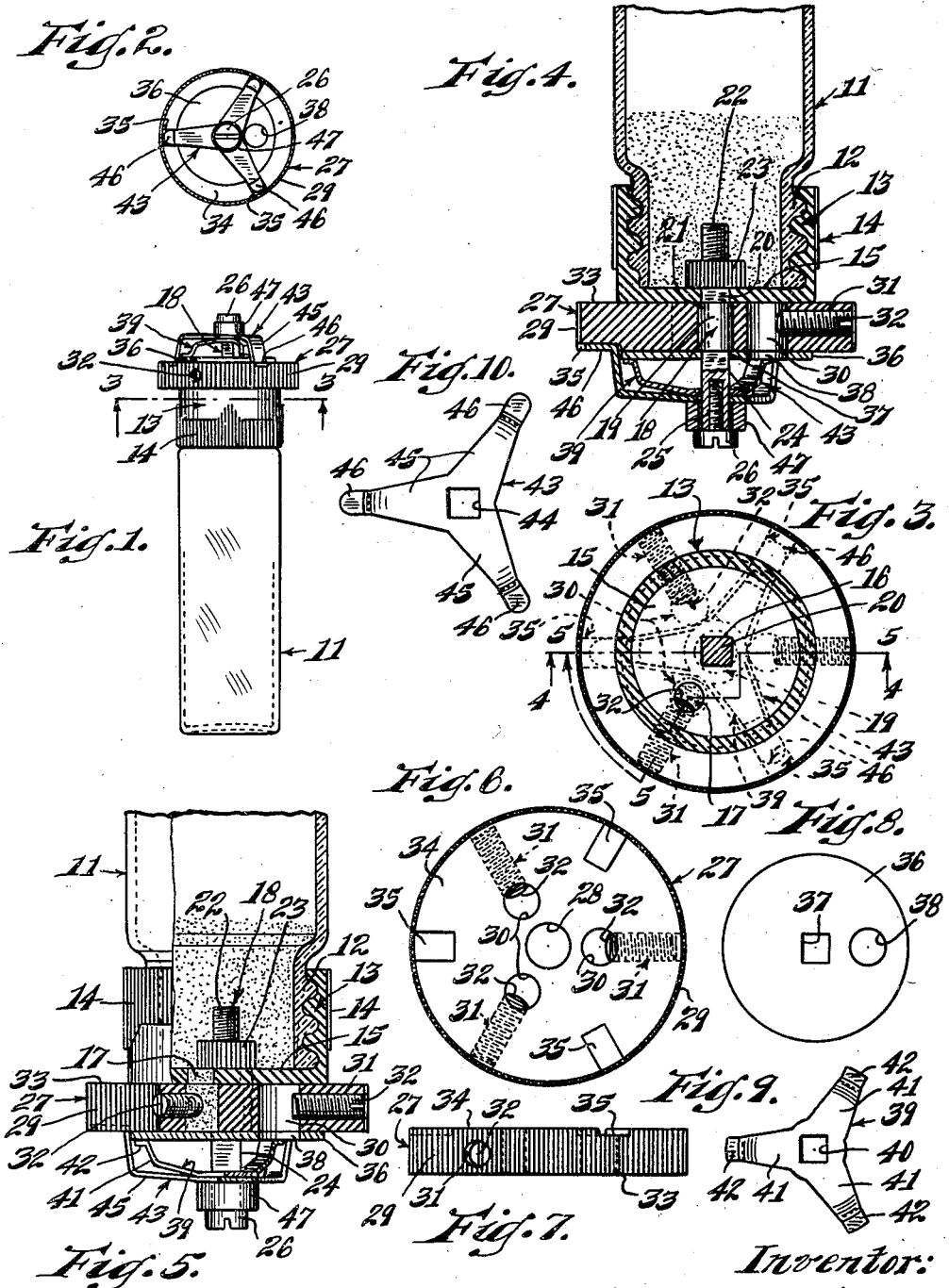
Inventor:
Edward L. Chott,
By Joshua R. H. Potts
his Attorney.

Patented Apr. 5, 1938

2,113,460

UNITED STATES PATENT OFFICE 2,113,460

DISPENSER

Edward L. Chott, Chicago, Ill.

Application May 13, 1936, Serial No. 79,410

6 Claims. (Cl. 221—109)

This invention relates to dispensers and more particularly to a dispensing device such as used by dentists in measuring material for tooth fillings.

The general object of the invention is to provide an improved dispensing device, principally but not exclusively, for dentists in dispensing and measuring a predetermined accurate quantity of finely comminuted material for use in tooth fillings.

The invention consists of the novel combinations and arrangements of parts as fully described hereinbelow and shown in the accompanying drawing, in which:

Fig. 1 is a side view of a device embodying my invention;

Fig. 2 is an end view of the same;

Fig. 3 is an enlarged cross-section taken along the line 3—3 of Fig. 1;

Fig. 4 is a sectional elevation taken along the line 4—4 of Fig. 3;

Fig. 5 is a similar view taken along the line 5—5 of Fig. 4;

Fig. 6 is an inverted plan view of the rotary measuring cylinder;

Fig. 7 is a side view of the same;

Fig. 8 is a view of the discharge aperture plate; and

Figs. 9 and 10 are views of spring elements incorporated in my invention.

Referring more particularly to the drawing, I show a receptacle or container 11 having an open threaded neck portion 12 to which is detachably secured a threaded cap member 13, which member is preferably provided with a knurled peripheral portion 14 for convenience in securing the cap member to the container. Cap 13 is provided with a base portion 15 having substantially flat inner and outer surfaces and is provided with a central square aperture 16 and a discharge aperture 17 which may conveniently be circular. A stud member 18 having a cylindrical bearing portion 19 is provided with a square shank 20 adapted to fit closely in aperture 16 of cap member 13. Bearing portion 19 is provided with a shoulder 21 adapted to be held against the outer flat surface of base 15, and a threaded lock nut 23 is adapted to secure the stud 18 in the position shown in Fig. 4 by locking against the inner surface of member 15. Stud member 18 is further provided with a square shank 24 having an internally threaded end portion 25 which receives a fillister head screw 26. A rotary measuring cylinder 27 having a thickness substantially equal to the length of bearing 19 is provided with a central bearing port 28 adapted for bearing engagement with bearing 19. Cylinder 27 has a knurled periphery adapted for facility in turning the same and is provided with a number of measuring ports 30 equally spaced along an arc about the central port 28 and at the same radial distance from the center of rotation as that of discharge aperture 17 of member 13. In the example shown there are three measuring ports 30 spaced from each other by 120 degrees of rotation. However, this number is arbitrary and may be any number more or less as desired. A threaded bore 31 extends radially from each measuring port 30 to the periphery 29 and receives an adjustable headless screw 32, the inner end of which is adapted to extend into its port 30 a variable distance in order to change the effective volume of said measuring port. Measuring cylinder 27 is provided with an inner flat face 33 adapted to fit closely with the outer face of base portion 15 of the cap 13 and is provided with a similar flat outer face 34 in which, adjacent the periphery 29, are a plurality of indexing grooves 35 equally spaced along the periphery, there being the same number of grooves 35 as there are measuring ports 30.

Located adjacent outer face 34 is a flat disklike apertured plate 36 having a central rectangular aperture 37 through which shank 24 is adapted to extend, the plate 36 being fixed against rotation by its rectangularly apertured mounting on shank 24. Plate 36 is provided with a circular aperture discharge port 38 a radial distance from the center of rotation of cylinder 27 as measuring ports 30. A three-arm spring member 39 has a rectangular stud aperture 40 adapted to be carried by shank 24 and radially extending spring arms 41, each having terminal contact fingers 42 for contact with discharge plate 36 at a point adjacent the periphery thereof. A similarly shaped indexing spring member 43 is provided with a rectangular stud aperture 44 for mounting on shank member 24 and has a plurality of radially extending spring arms 45, each provided with indexing fingers 46 which are adapted to engage grooves 35 in sequence as cylinder 27 may be rotated. A collar 47 is held against spring member 43 and secured in position on shank 24 by fillister head screw 26.

The operation of the device should be obvious from the foregoing description. The adjustable measuring ports 30 are sequentially passed under discharge aperture 17, and as each port comes to rest in that position the measuring port will fill with material from the container 11. In this position indexing fingers 46 of member 43 will engage the grooves 35 of cylinder 27, and one of the previously filled measuring ports 30 will come to rest over discharge port 38 of the plate 36, discharging the material in port 30 through port 38 to whatever convenient receptacle the material is desired to be discharged into. The compression of spring arms 41 of spring member 39 will maintain plate 36 closely against face 34 of cylinder 27, and spring member 43 will likewise maintain member 27 against the outer face of base portion 15 of cap 13. In this manner there will be no danger of leakage of material between the said associated parts, and filling and discharge of ports 30 will be accomplished with no loss of efficiency. If it is desired to change the quantity of material sought to be discharged at each dispensing interval, the adjusting screws 32 may be, by turning, advanced into or retracted from the apertures in measuring ports 30 and the volume content thereof decreased or increased as desired.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The combination with a container of a dispenser unit comprising a closure cap member having a dispensing aperture, a bearing member fixed on said cap member, a peripherally operable rotatable measuring cylinder mounted on said bearing having a plurality of arcuately spaced measuring apertures, a discharge aperture plate having a discharge aperture, and radially adjustable means to vary the size of said measuring apertures, said means including screws extending into said apertures from the periphery of said cylinder.

2. The combination with a container of a dispenser unit comprising a closure cap member having a dispensing aperture, a bearing member fixed on said cap member, a peripherally operable rotatable measuring cylinder mounted on said bearing having a plurality of arcuately spaced measuring apertures, a discharge aperture plate having a discharge aperture, and radially adjustable means to vary the size of said measuring apertures, said means including screws extending into said apertures from the periphery of said cylinder.

3. The combination with a container of a dispenser unit comprising a closure cap member having a dispensing aperture, a bearing member fixed on said cap member, a rotatable measuring cylinder mounted on said bearing having a plurality of arcuately spaced adjustable measuring apertures, a discharge aperture plate having a discharge aperture, and spring and groove indexing means for said measuring cylinder.

4. The combination with a container of a dispenser unit comprising a closure cap member having a dispensing aperture, a bearing member fixed on said cap member, a rotatable measuring cylinder mounted on said bearing having a plurality of arcuately spaced adjustable measuring apertures, a discharge aperture plate having a discharge aperture, and indexing means for said measuring cylinder, said means including grooves on said cylinder and a yoke spring engageable therewith.

5. The combination with a container of a dispenser unit comprising a closure cap member having a dispensing aperture, a bearing member fixed to said cap member, a measuring cylinder mounted on said bearing having a plurality of measuring apertures and indexing grooves, a discharge aperture plate having a discharge aperture, and resilient means to maintain said plate against said cylinder, said means adapted to engage said grooves for said indexing.

6. The combination with a container of a dispenser unit comprising a closure cap member having a dispensing aperture, a bearing member fixed to said cap member, a measuring cylinder mounted on said bearing having a plurality of measuring apertures and indexing grooves, a discharge aperture plate having a discharge aperture, and means to maintain said plate against said cylinder, said means including a yoke spring adapted to engage said plate, and said grooves for said indexing.

EDWARD L. CHOTT.